United States Patent
Nonaka

(10) Patent No.: US 10,476,327 B2
(45) Date of Patent: Nov. 12, 2019

(54) ROTARY ELECTRICAL MACHINE

(71) Applicant: KABUSHIKI KAISHA YASKAWA DENKI, Kitakyushu-shi (JP)

(72) Inventor: Tuyoshi Nonaka, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 503 days.

(21) Appl. No.: 15/133,230

(22) Filed: Apr. 20, 2016

(65) Prior Publication Data

US 2016/0233732 A1   Aug. 11, 2016

Related U.S. Application Data

(63) Continuation of application No. PCT/JP2014/079772, filed on Nov. 10, 2014.

(30) Foreign Application Priority Data

Nov. 11, 2013   (JP) .................. 2013-232811

(51) Int. Cl.
*H02K 1/27* (2006.01)
*H02K 1/28* (2006.01)
(Continued)

(52) U.S. Cl.
CPC .............. *H02K 1/2766* (2013.01); *H02K 1/28* (2013.01); *H02K 1/30* (2013.01); *H02K 7/118* (2013.01);
(Continued)

(58) Field of Classification Search
CPC .. H02K 1/27–2793; H02K 1/28; H02K 11/21; H02K 11/215; H02K 11/00–04
(Continued)

(56) References Cited

U.S. PATENT DOCUMENTS 5,091,668 A * 2/1992 Cuenot ................ H02K 1/2773
310/156.61
7,567,006 B2   7/2009 Ichiyama
(Continued)

FOREIGN PATENT DOCUMENTS

CN    102684335    9/2012
JP    2002-204541  7/2002
(Continued)

OTHER PUBLICATIONS

Machine Translation, Yasuda, JP 2011015523 A, Jan. 20, 2011. (Year: 2011).*
(Continued)

*Primary Examiner* — Thomas Truong
(74) *Attorney, Agent, or Firm* — Mori & Ward, LLP

(57) ABSTRACT

This disclosure discloses a rotary electrical machine of a variable field type configured to change a field magnetic flux. The rotary electrical machine includes a stator including stator windings and a stator core, and a rotor including a shaft rotatably supported, a rotor core relatively rotatably mounted on the shaft, and a plurality of first permanent magnets disposed on the rotor core. The rotor core is configured to be held at a predetermined angular position with respect to the shaft with a magnetic suction force of the first permanent magnet, and to increase a relative angle with the shaft in response to an increase of a load torque against the magnetic suction force. The rotor core has an approximately same axial length as the stator core.

9 Claims, 15 Drawing Sheets

(51) Int. Cl.
| | |
|---|---|
| *H02K 11/00* | (2016.01) |
| *H02K 21/16* | (2006.01) |
| *H02K 1/30* | (2006.01) |
| *H02K 7/118* | (2006.01) |
| *H02K 11/21* | (2016.01) |
| *H02K 7/00* | (2006.01) |

(52) U.S. Cl.
CPC .............. *H02K 11/21* (2016.01); *H02K 21/16* (2013.01); *H02K 7/003* (2013.01)

(58) Field of Classification Search
USPC ............... 310/68 B, 156.12, 156.13, 156.19, 310/156.22, 156.43, 156.48, 156.53, 310/156.55, 156.56
See application file for complete search history.

(56) References Cited

U.S. PATENT DOCUMENTS

| | | | |
|---|---|---|---|
| 7,999,432 B2 | 8/2011 | Ichiyama | |
| 2006/0202580 A1* | 9/2006 | Lee ...................... | H02K 1/2773 310/156.45 |
| 2011/0057533 A1* | 3/2011 | Murakami ........... | H02K 1/2766 310/156.43 |
| 2012/0229066 A1* | 9/2012 | Nonaka ................ | H02K 21/029 318/400.41 |
| 2012/0326548 A1* | 12/2012 | Nonaka ................ | H02K 1/2773 310/156.19 |

FOREIGN PATENT DOCUMENTS

| | | | |
|---|---|---|---|
| JP | 2002204541 A * | 7/2002 | |
| JP | 2004-072978 | 3/2004 | |
| JP | 2004-320864 | 11/2004 | |
| JP | 2011-015523 | 1/2011 | |
| JP | 2011015523 A * | 1/2011 | |
| JP | 2012-200053 | 10/2012 | |
| WO | WO-2011114594 A1 * | 9/2011 | ........... H02K 1/2773 |

OTHER PUBLICATIONS

Machine Translation, Sumino, JP-2002204541-A, Jul. 2002. (Year: 2002).*
English translation of the Written Opinion for corresponding International Application No. PCT/JP2014/079772, dated Jan. 27, 2015.
Chinese Office Action for corresponding CN Application No. 201480056138.1, dated Aug. 2, 2017.
Chinese Office Action for corresponding CN Application No. 201480056138.1, dated Jan. 16, 2018.
Japanese Office Action for corresponding JP Application No. 2015-546718, dated Nov. 8, 2016.
International Search Report for corresponding International Application No. PCT/JP2014/079772, dated Jan. 27, 2015.
Written Opinion for corresponding International Application No. PCT/JP2014/079772, dated Jan. 27, 2015.

* cited by examiner

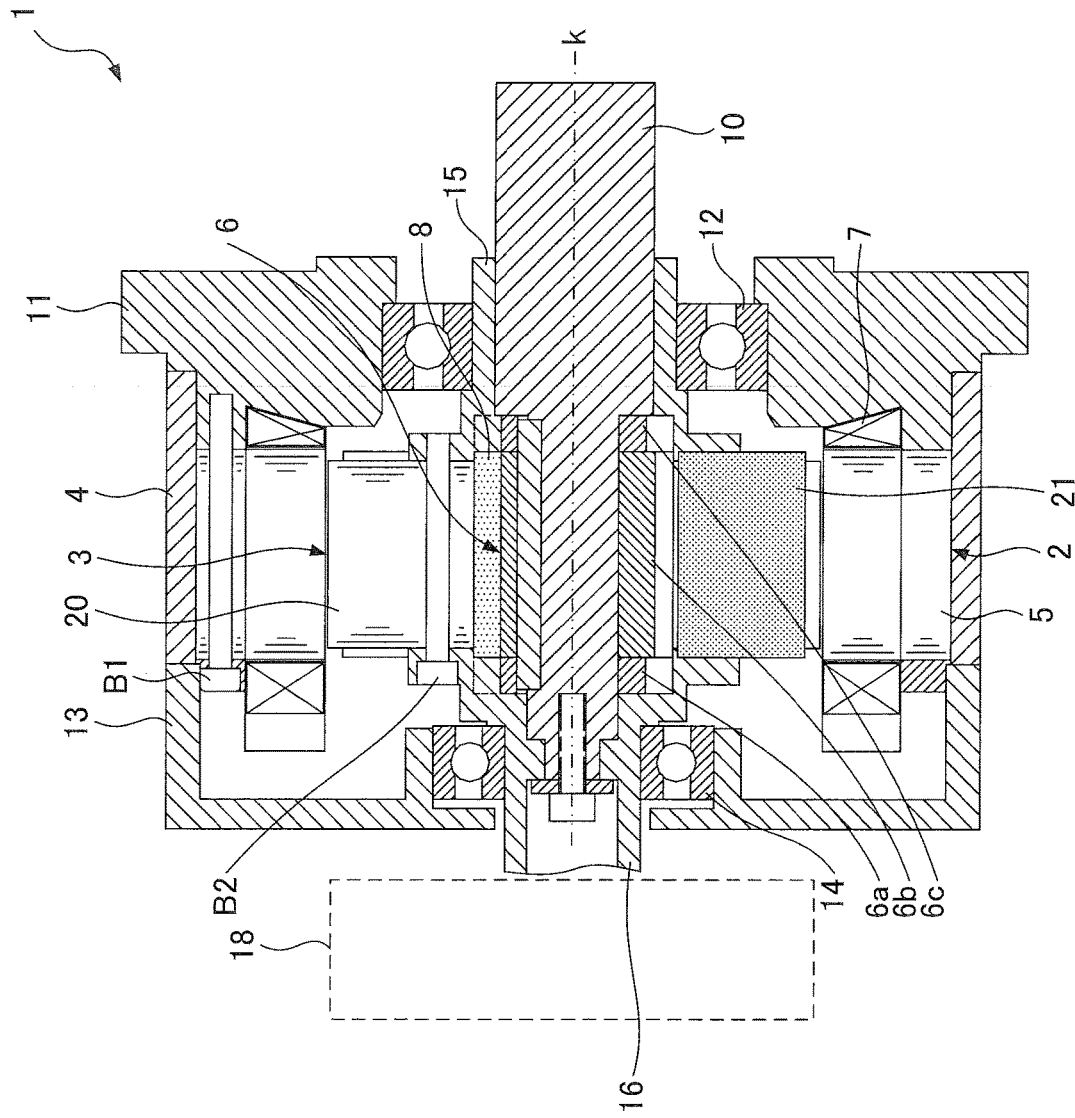
[FIG. 1]

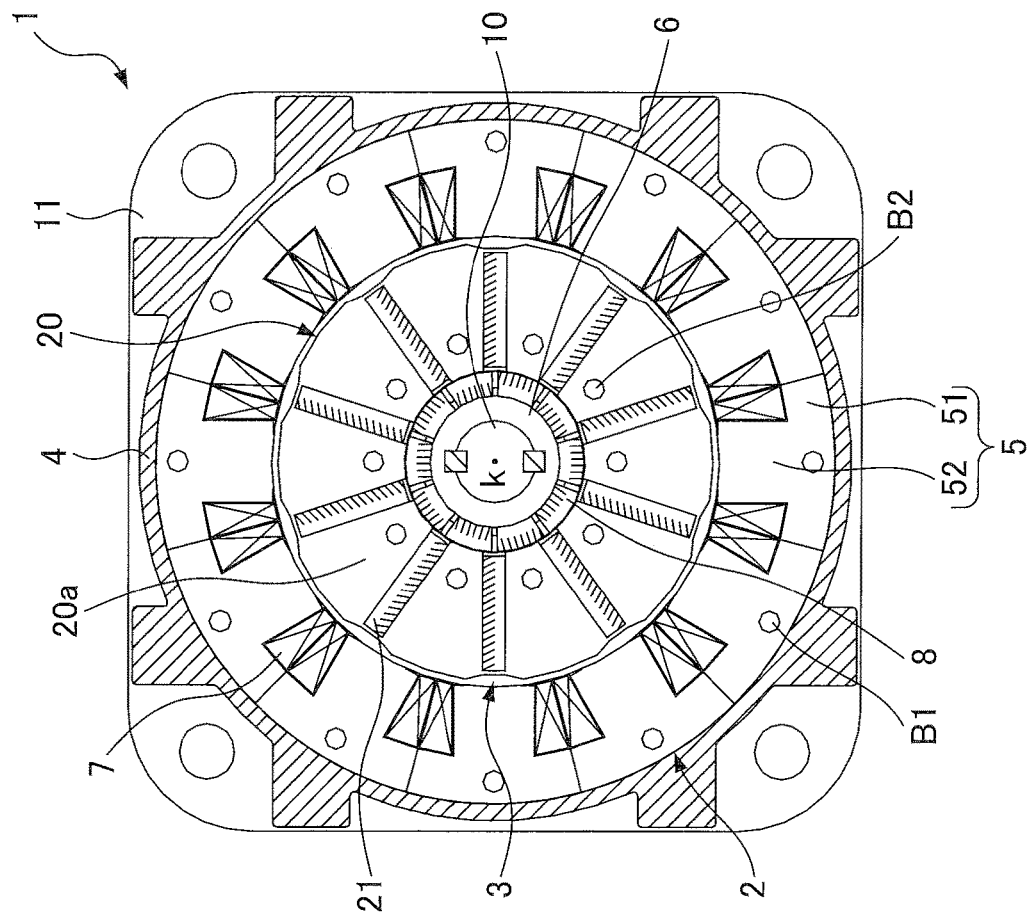
[FIG. 2]

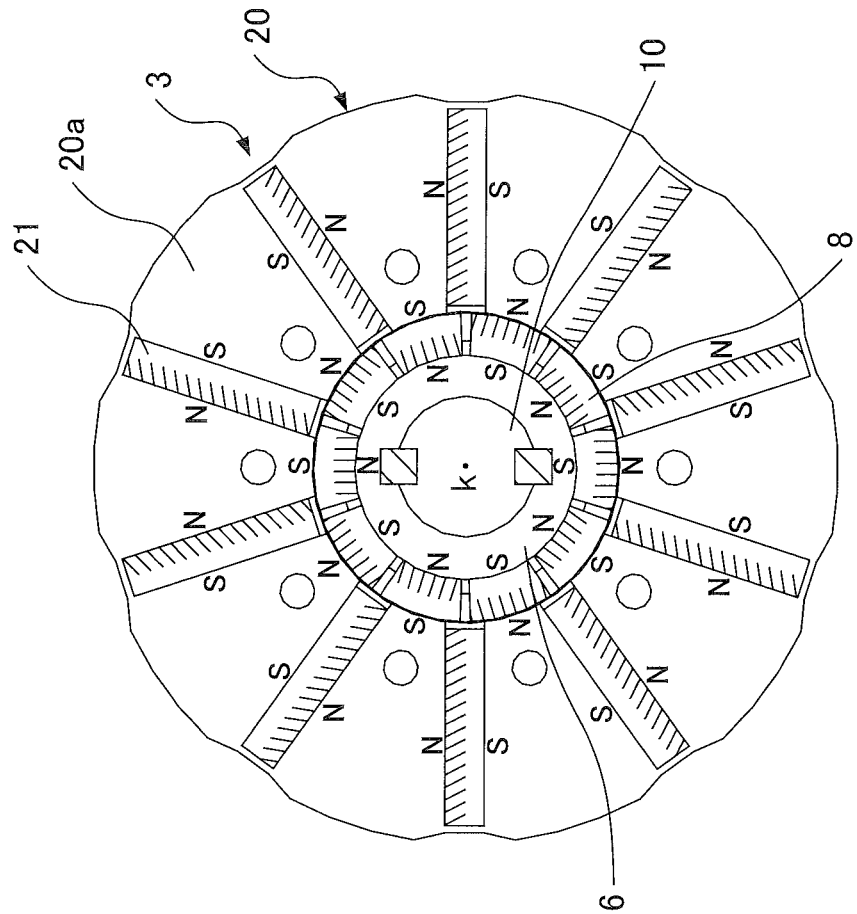
[FIG. 3]

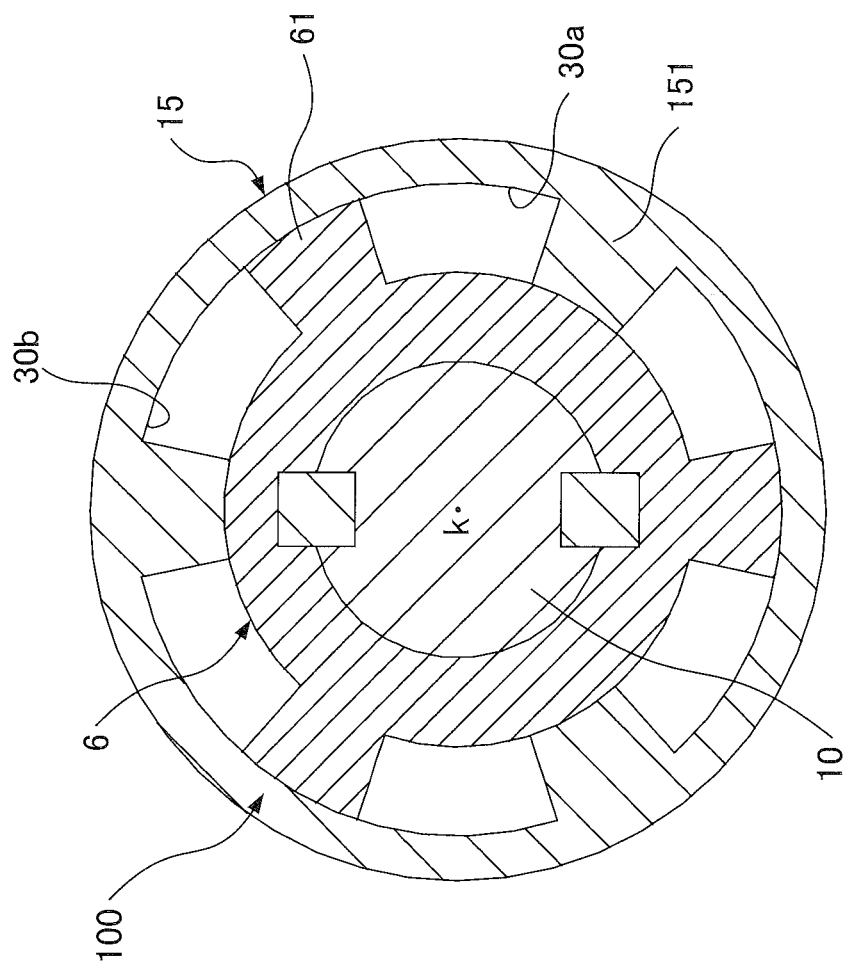
[FIG. 4]

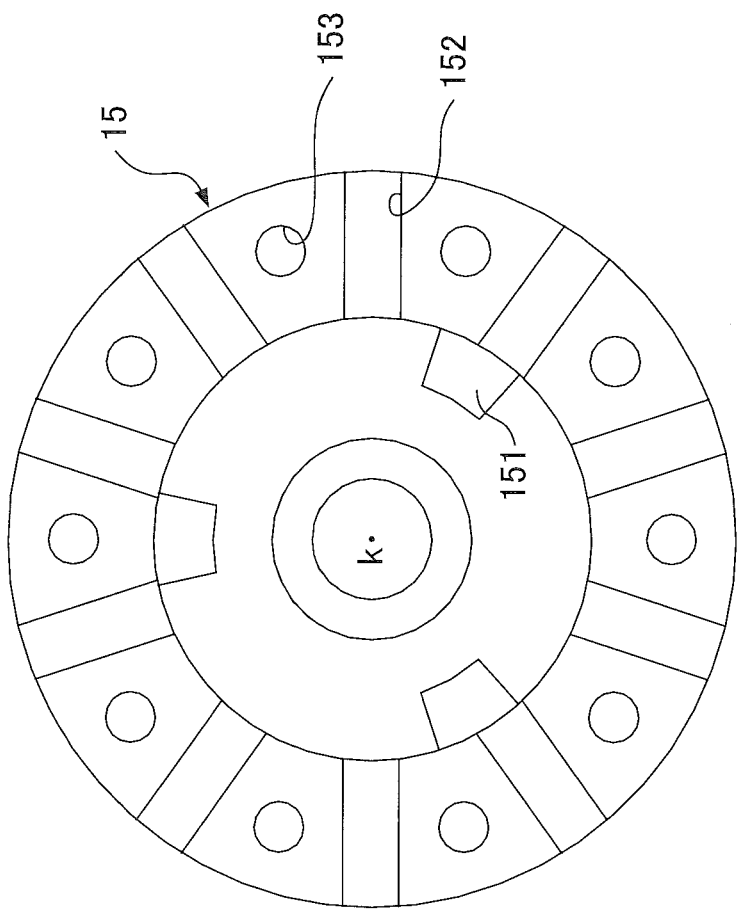
[FIG. 5]

[FIG. 6]
LOAD TORQUE SMALL
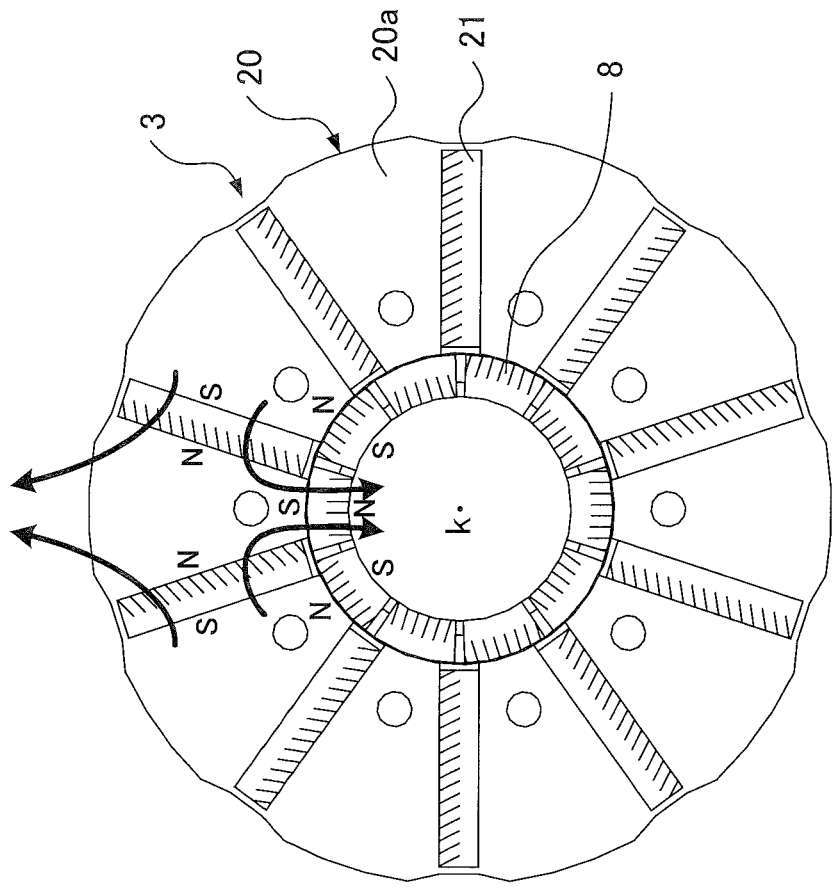

[FIG. 7]
LOAD TORQUE MEDIUM
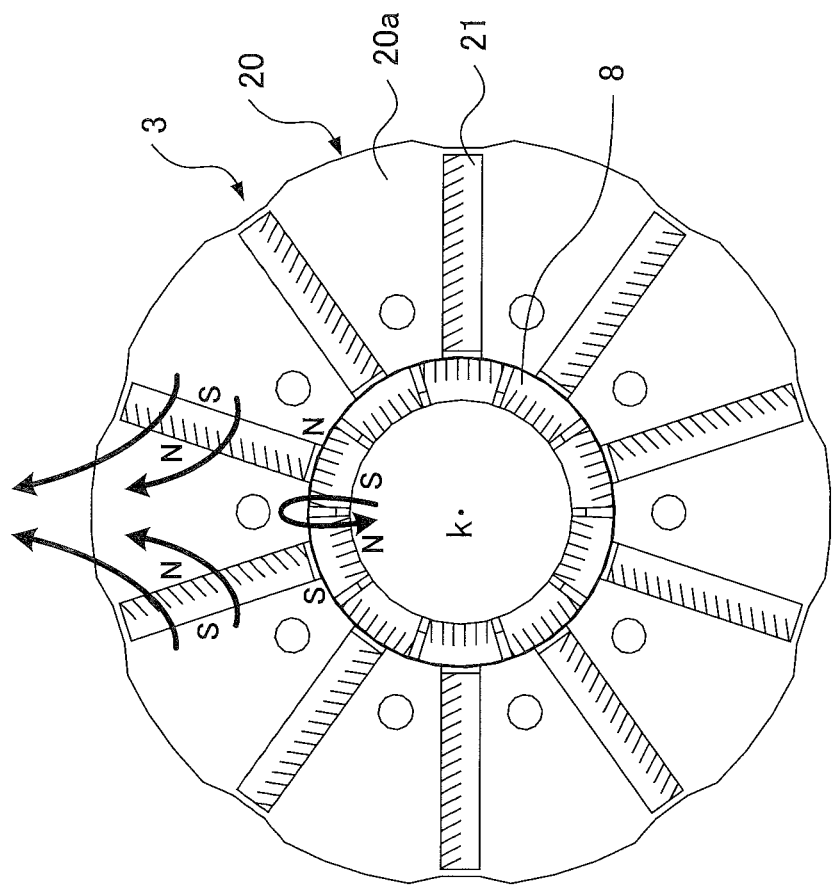

[FIG. 8]
LOAD TORQUE LARGE
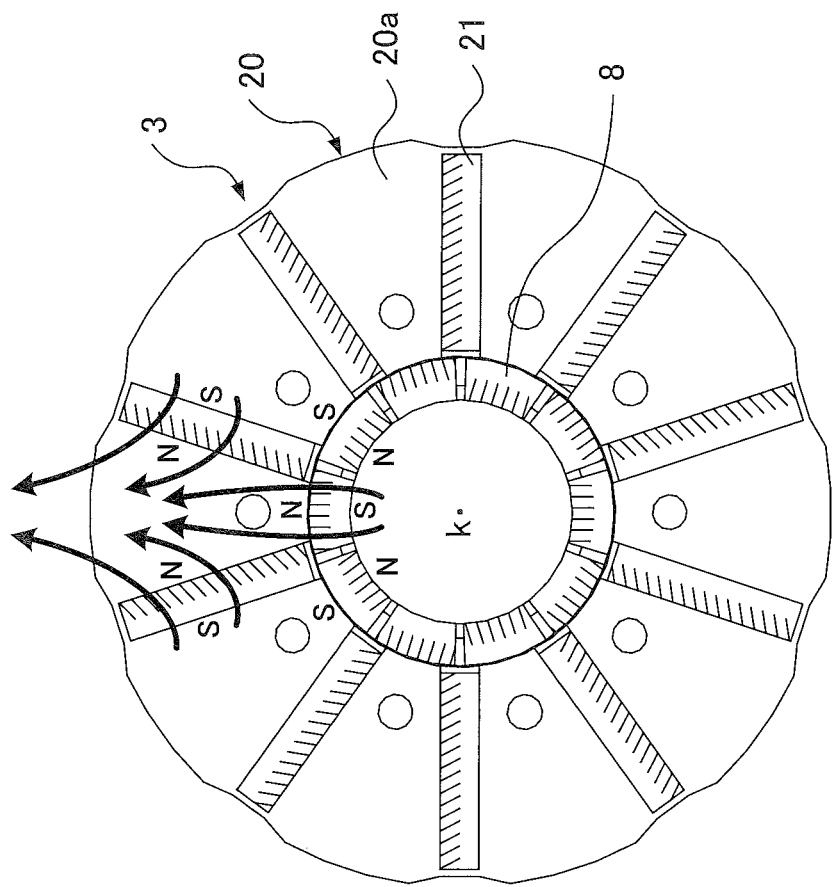

[FIG. 9]
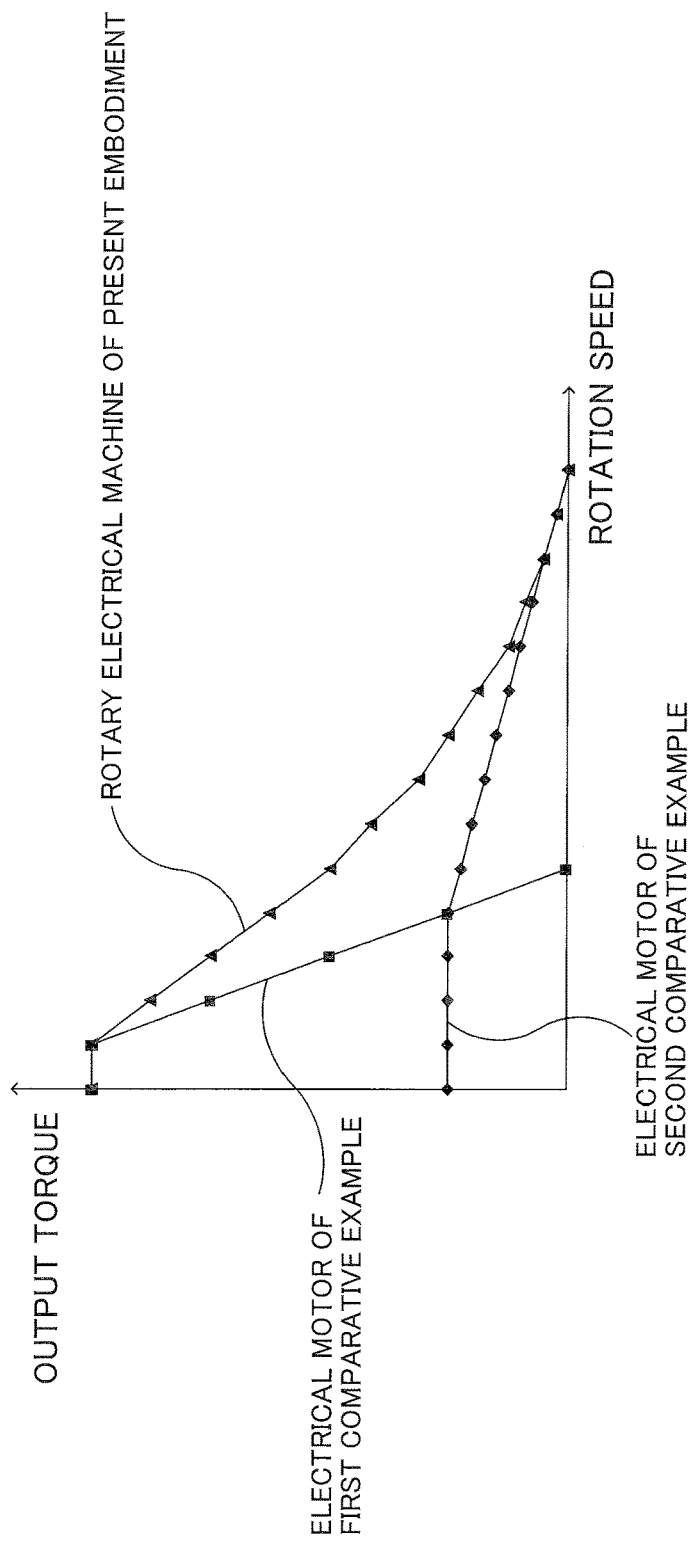

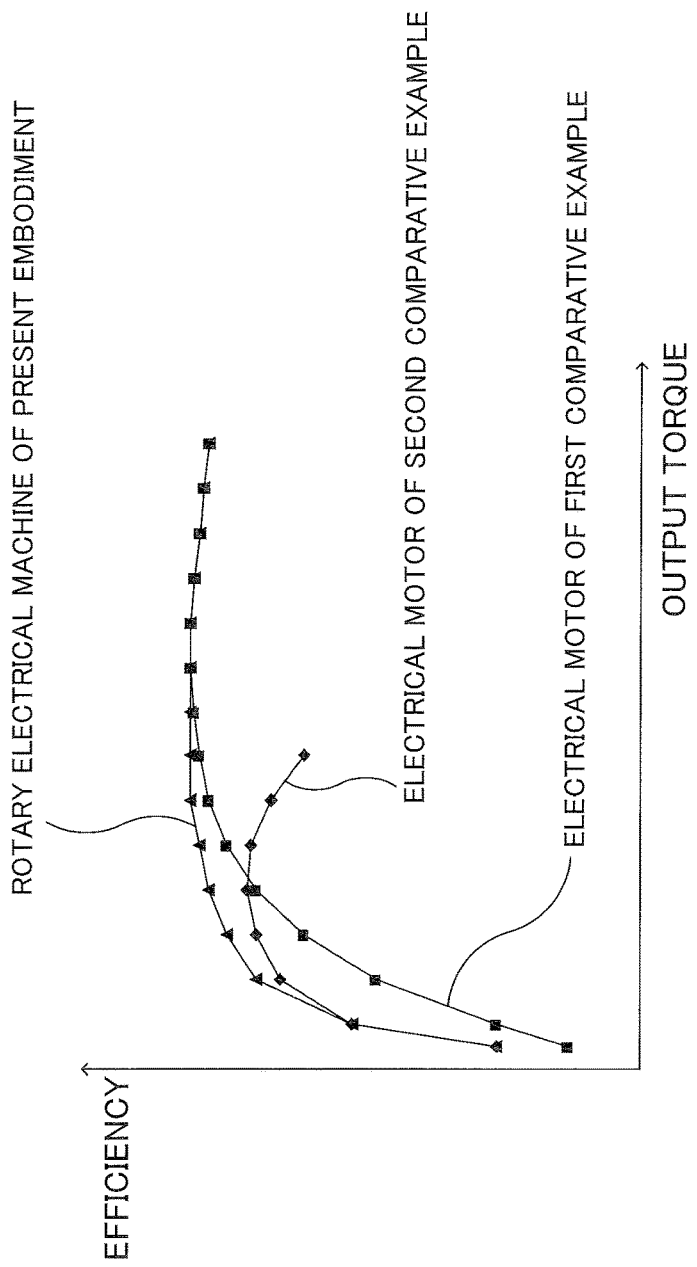
[FIG. 10]

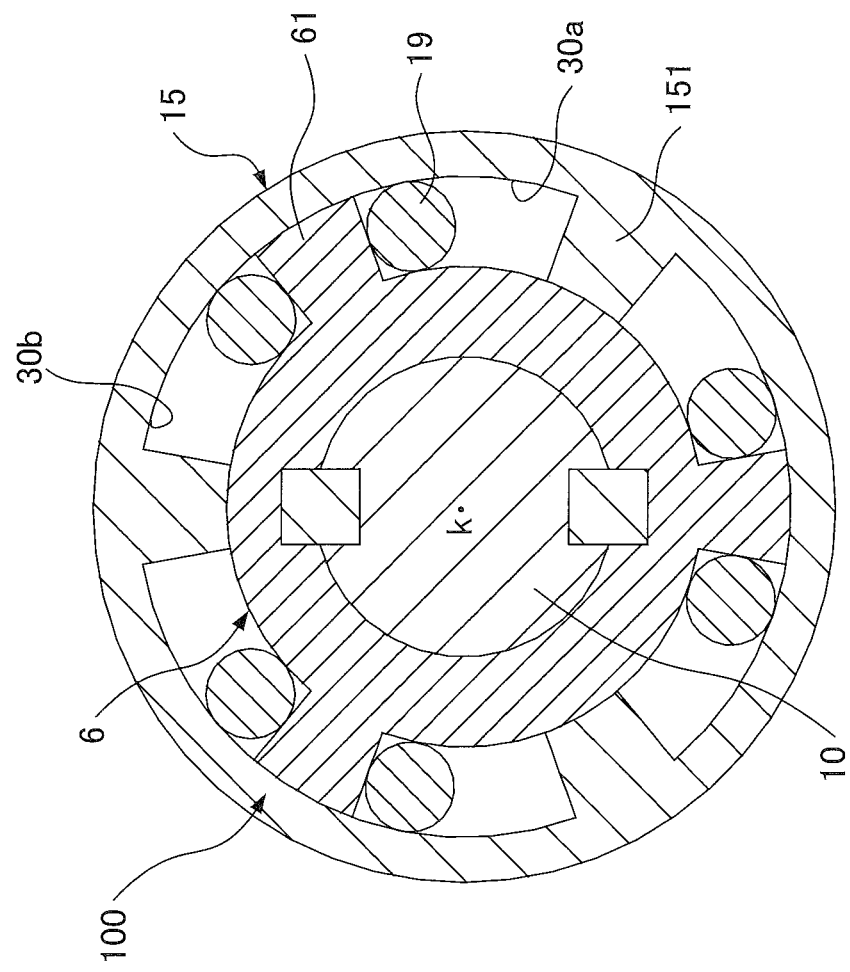
[FIG. 11]

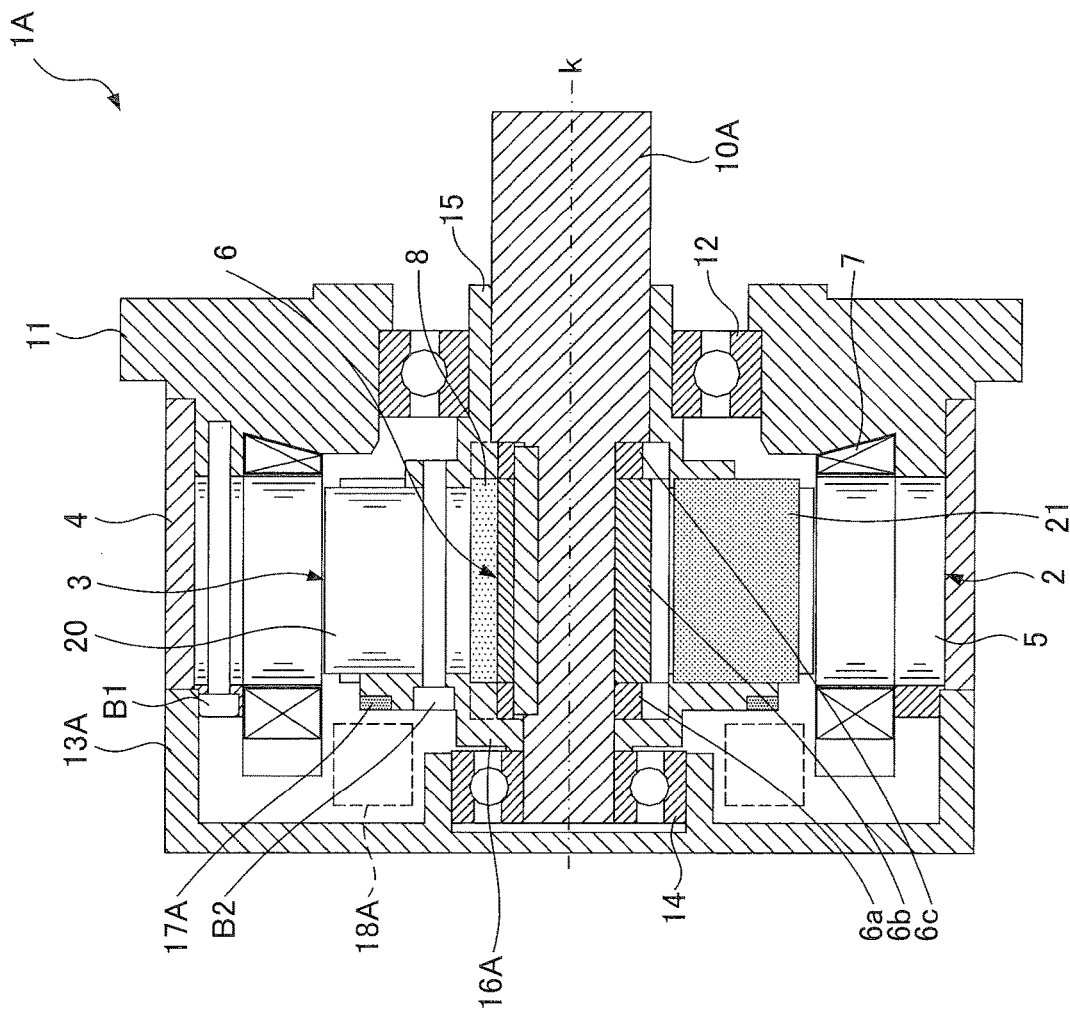
[FIG. 12]

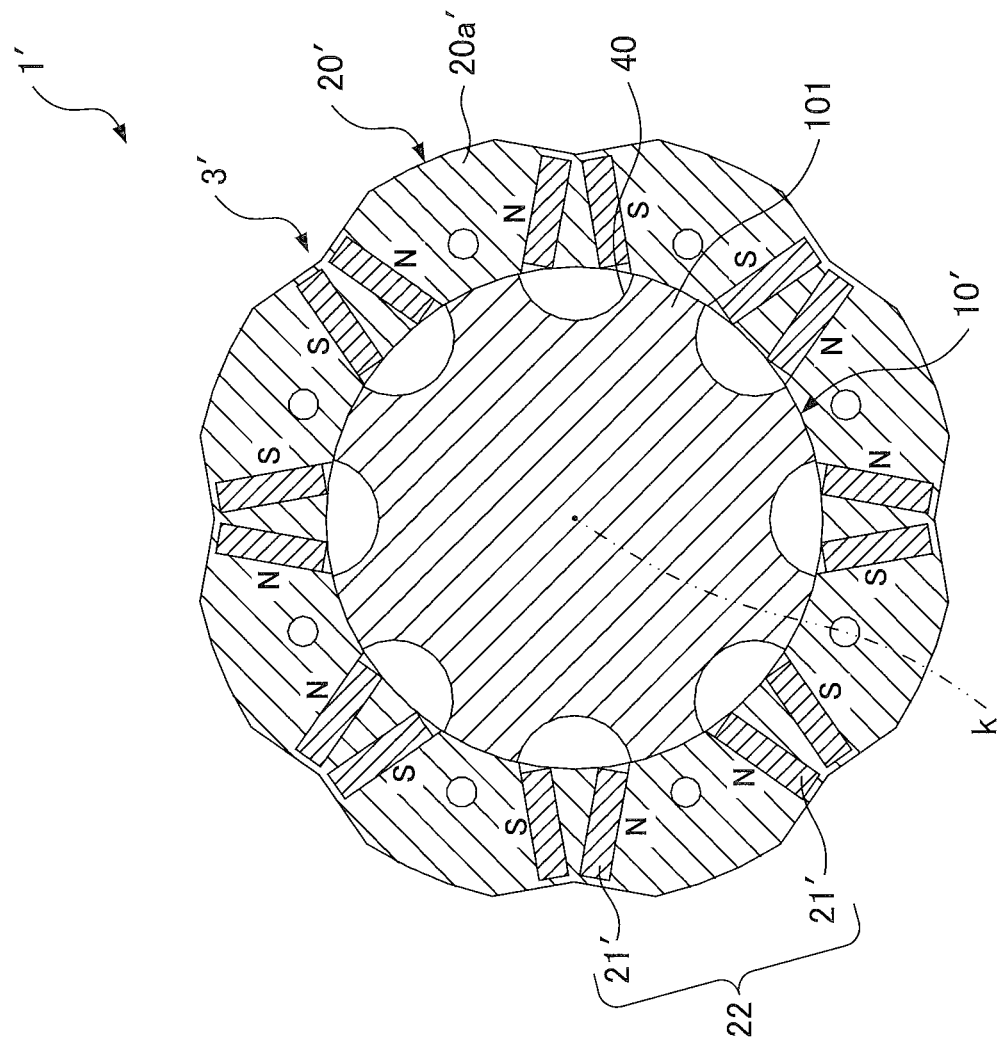
[FIG. 13]

[FIG. 14]
LOAD TORQUE SMALL
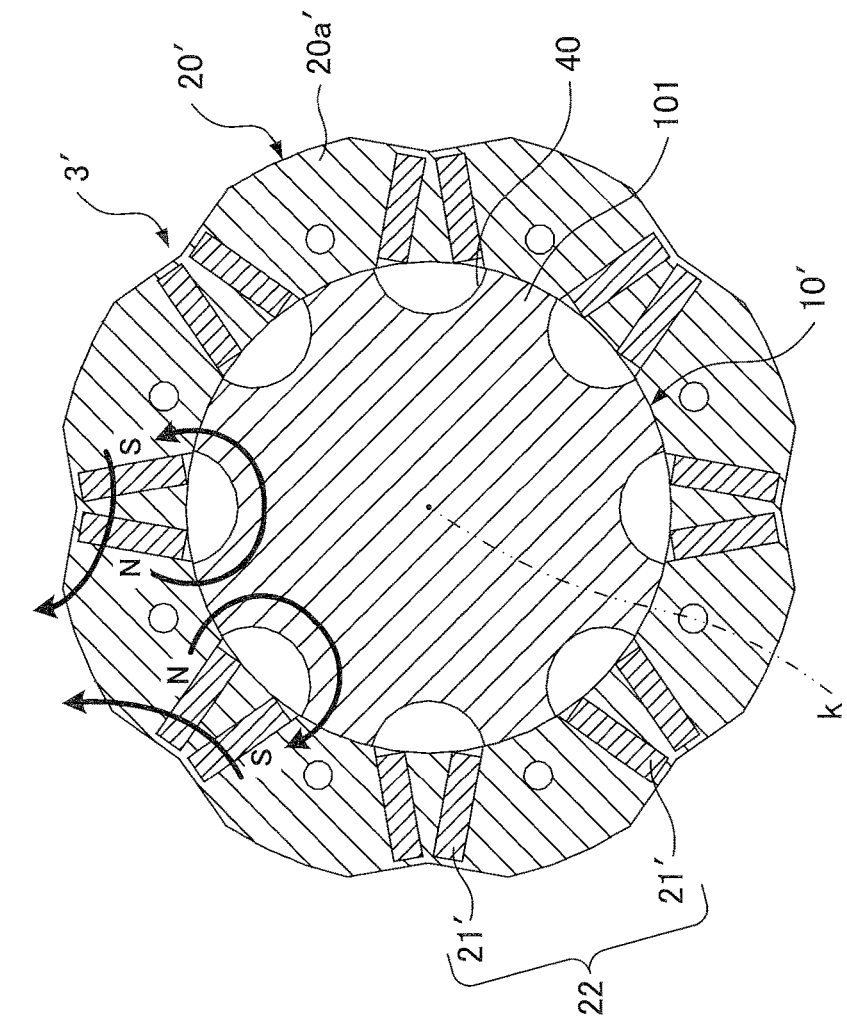

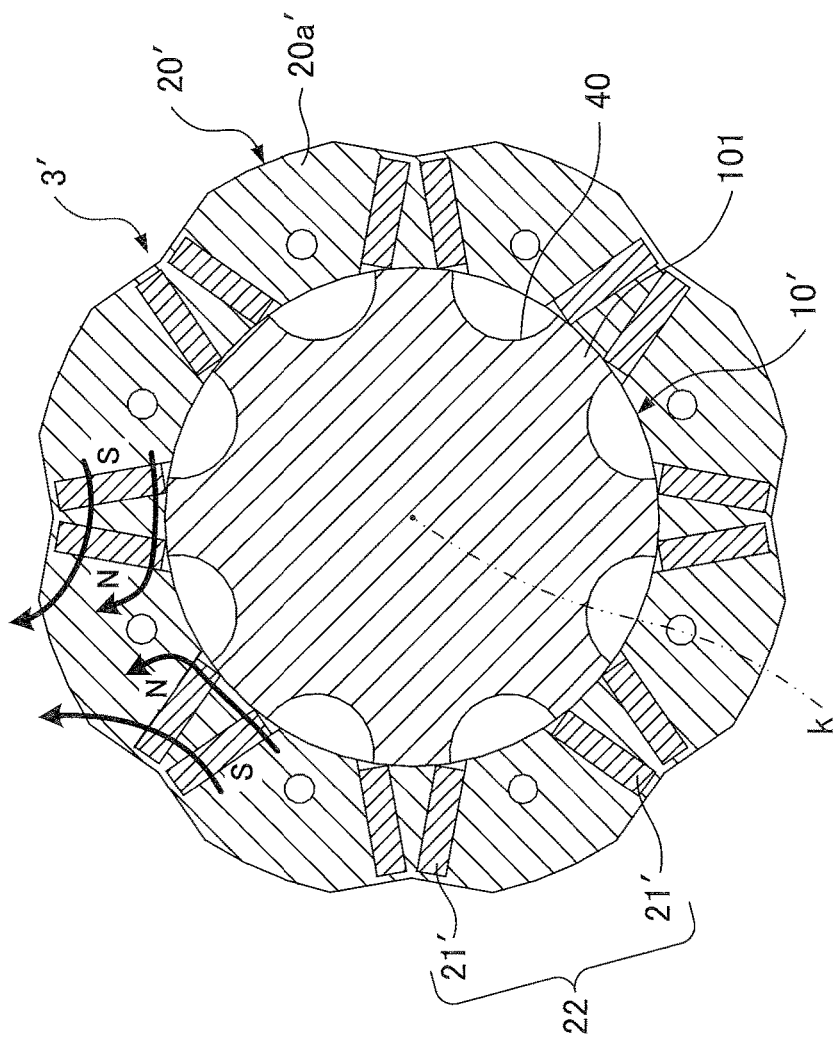
[FIG. 15]
LOAD TORQUE LARGE

ROTARY ELECTRICAL MACHINE

CROSS-REFERENCE TO RELATED APPLICATION

This is a continuation application of PCT/JP2014/079772, filed Nov. 10, 2014, which was published under PCT article 21(2).

TECHNICAL FIELD

The disclosed embodiment relates to a rotary electrical machine of a variable field type.

BACKGROUND

A motor that can obtain high torque at a low rotational region and further can rotate up to a high rotational region is known.

SUMMARY

According to one aspect of the disclosure, there is provided a rotary electrical machine of a variable field type configured to change a field magnetic flux. The rotary electrical machine includes a stator including stator windings and a stator core, and a rotor including a shaft rotatably supported, a rotor core relatively rotatably mounted on the shaft, and a plurality of first permanent magnets disposed on the rotor core. The rotor core is configured to be held at a predetermined angular position with respect to the shaft with a magnetic suction force of the first permanent magnet, and to increase a relative angle with the shaft in response to an increase of a load torque against the magnetic suction force. The rotor core has an approximately same axial length as the stator core.

BRIEF DESCRIPTION OF THE DRAWING

FIG. 1 is an axial cross-sectional view illustrating a configuration of a rotary electrical machine of a first embodiment.

FIG. 2 is a radial cross-sectional view illustrating the configuration of the rotary electrical machine.

FIG. 3 is a radial cross-sectional view illustrating a configuration of a rotor and a shaft-side permanent magnet.

FIG. 4 is a radial cross sectional view illustrating a configuration of a cylindrical member and a load-side side plate.

FIG. 5 is a plan view illustrating a configuration of the load-side side plate.

FIG. 6 is an explanatory diagram for illustrating a principle of changing a field magnetic flux in response to a load torque.

FIG. 7 is an explanatory diagram for illustrating a principle of changing a field magnetic flux in response to a load torque.

FIG. 8 is an explanatory diagram for illustrating a principle of changing a field magnetic flux in response to a load torque.

FIG. 9 is a graph illustrating a relationship between a rotation speed and output torque regarding the rotary electrical machine of the first embodiment, a motor of a first comparative example, and a motor of a second comparative example.

FIG. 10 is a graph illustrating a relationship between the output torque and efficiency regarding the rotary electrical machine of the first embodiment, the motor of the first comparative example, and the motor of the second comparative example.

FIG. 11 is a radial cross-sectional view illustrating a configuration of a cylindrical member and a load-side side plate in a modification example in which an elastic body is arranged between protruding parts.

FIG. 12 is an axial cross-sectional view illustrating a configuration of a rotary electrical machine of the modification example in which a rotational position detector is arranged at an opposite load-side side plate.

FIG. 13 is a radial cross-sectional view illustrating a configuration of a rotor and shaft of a second embodiment.

FIG. 14 is an explanatory diagram for illustrating a principle of changing the field magnetic flux in response to the load torque.

FIG. 15 is an explanatory diagram for illustrating a principle of changing the field magnetic flux in response to the load torque.

DESCRIPTION OF THE EMBODIMENTS

Embodiments will be described below with reference to figures.

1. First Embodiment

First, a first embodiment will be described.

1-1. Configuration of Rotary Electrical Machine

First, with reference to FIGS. 1 to 5, a configuration of a rotary electrical machine of the present embodiment will be described. A state of each configuration of the rotary electrical machine illustrated in FIGS. 1 to 5 corresponds to a case where load torque is small.

As illustrated in FIGS. 1 to 5, a rotary electrical machine 1 of the present embodiment includes a stator 2 in a substantially cylindrical shape and a rotor 3 including a shaft 10.

According to the example, the rotary electrical machine 1 is a so-called motor of an inner rotor type, in which the rotor 3 is arranged inside the stator 2. Further, the rotary electrical machine 1 is a motor of a variable field type for changing the field magnetic flux. The rotary electrical machine 1 does not include a rotor phase control mechanism for changing (increasing) a relative angle between the shaft 10 and a rotor core 20 (described below) of the rotor 3.

The stator 2 is fixed to an inner circumference of a frame 4 in a substantially cylindrical shape. A load-side bracket 11 is disposed at an axial load side of the frame 4 (right side in FIG. 1). At an axial opposite load side of the frame 4 (left side in FIG. 1), an opposite load-side bracket 13 is fixed to the frame 4 with a bolt (not illustrated). Further, the stator 2 includes a plurality (12 in the example in FIG. 2) of stator cores 5 and stator windings 7 having the same number as the stator cores 5.

According to the present specification, the "load side" indicates a rotational force output side of the rotary electrical machine 1, in other words, in the example, a direction (right side in FIG. 1) in which the shaft 10 is protruded. The "opposite load side" indicates a side opposite to the rotational force output side, in other words, in the example, a direction (left side in FIG. 1) in which a rotational position detector 18 is arranged for the rotary electrical machine 1.

A plurality of stator cores 5 is fixed to the inner circumference of the frame 4 in a circumferential direction. Each stator core 5 is fixed to a surface inside the load-side bracket 11 in the axis direction with a bolt B1. The bolt B1 passes through the stator core 5 from the axial opposite load side of the stator core 5, and is screwed with the load-side bracket 11. Further, each stator core 5 includes a yoke part 51 in a substantially arc shape, a teeth part 52 protruding to an inner circumferential side from the yoke part 51.

Each of the stator windings 7 is mounted on the teeth part 52 of each stator core 5.

The rotor 3 is arranged inside the stator 2 so as to face an inner circumferential surface of the stator 2 in the radial direction via a magnetic void. The rotor 3 includes a rotor core 20 in a substantially cylindrical shape, the shaft 10 arranged to be coaxial with the rotor 3 inside the rotor core 20 and a plurality of (10 in the example in FIG. 3) permanent magnets 21 (correspond to an example of first permanent magnet. appropriately referred to as "rotor-side permanent magnet 21" hereinafter). The shaft 10 is rotatably supported about an axis "k" extending in the axis direction (right and left direction in FIG. 1) inside the stator 2 in the radial direction. As illustrated in each figure, a side provided with hatching in the permanent magnet 21 is an N-pole side, and its opposite side is an S-pole side.

The rotor core 20 is formed to have its axial length substantially equal to that of the stator core 5. Further, the rotor core 20 is mounted on an outer circumference of a plurality of permanent magnets 8 described below, can be rotated about an axis "k" with respect to the stator 2, and can be relatively rotated about the axis "k" with respect to the shaft 10, the cylindrical member 6 described below, and the plurality of permanent magnets 8. As described below, since the plurality of permanent magnets 8 is connected to the shaft 10, it can be said that the rotor core 20 is relatively rotatably mounted on the shaft 10.

The plurality of rotor-side permanent magnets 21 is arranged inside the rotor core 20 and is rotated along with a rotation of the rotor core 20. In other words, the rotor 3 is configured as a motor of a so-called IPM (Internal Permanent Magnet) type, in which the plurality of rotor-side permanent magnets 21 is embedded into the rotor core 20. Further, the plurality of rotor-side permanent magnets 21 is radially arranged about the axis "k" inside the rotor core 20 (a so-called I-like shape arrangement) such that the same magnetic poles (both N poles or both S poles) of the rotor-side permanent magnets 21 adjacent to each other in the rotational direction face each other.

Further, on the rotor core 20, a magnetic pole part 20a includes the plurality of rotor-side permanent magnets 21 between the rotor-side permanent magnets 21.

At a position radially facing the rotor core 20 on an outer circumference of the shaft 10, the cylindrical member 6 is fixed to be coaxial with the shaft 10. The cylindrical member 6 is rotated along with the rotation of the shaft 10. At an intermediate part 6b radially facing the rotor core 20 on an outer circumference of the cylindrical member 6, the permanent magnets 8 (corresponds to an example of second permanent magnets. appropriately referred to as "shaft-side permanent magnets 8") having the same number as a plurality of magnetic pole parts 20a configured on the rotor core 20 are disposed at an equal distance to have different polarities alternately in the rotational direction (N pole→S pole→N pole→S pole→ . . . ). As illustrated in each figure, a side provided with hatching in the permanent magnet 8 is an N-pole side, and its opposite side is an S-pole side.

When the load torque is small, the rotor core 20 is held at a predetermined angular position with respect to the shaft 10 with a magnetic suction force of the rotor-side permanent magnet 21. More specifically, when the load torque is small, the rotor core 20 is held with respect to the shaft 10 at the angular position where the magnetic pole part 20a and the shaft-side permanent magnet 8 having the different polarities from each other directly face each other, with the magnetic suction force thereof. The rotor core 20 is configured such that the relative angle with respect to the shaft 10 increases against the magnetic suction force in response to an increase of the load torque (details will be described below). With this arrangement, depending on a magnitude of the load torque, the field magnetic flux can be changed in the balance with the magnetic suction force (details will be described below).

Further, at an end part of the axial load side and at an end part of the opposite load side on the outer circumference of the cylindrical member 6, a side plate 15 (appropriately referred to as "load-side side plate 15" hereinafter) and a side plate 16 (appropriately referred to as "opposite load-side side plate 16" hereinafter) are mounted to be coaxial with the shaft 10, respectively.

The load-side side plate 15 is fixed to the end part of the rotor core 20 at the axial load side, and rotatably supported about the axis "k" with a load-side bearing 12 having the outer ring engaged into the load-side bracket 11. On the other hand, the opposite load-side side plate 16 is fixed to the end part of the rotor core 20 at the axial opposite load side, and rotatably supported about the axis "k" with an opposite load-side bearing 14 having the outer ring engaged into the opposite load-side bracket 13. The side plates 15, 16 are rotated along with the rotation of the rotor core 20, and can be relatively rotated about the axis "k" with respect to the shaft 10, the cylindrical member 6, and the plurality of shaft-side permanent magnets 8. Since the cylindrical member 6 is fixed to the shaft 10, it can be said that the side plates 15, 16 are relatively rotatably mounted on the shaft 10.

As illustrated in FIG. 5, on a surface of the load-side side plate 15 at the rotor core 20 side, in other words, on a surface thereof at the axial opposite load side, grooves 152 into which the end parts of the plurality of rotor-side permanent magnets 21 at the axial load side are fitted and which have the same number as the rotor-side permanent magnets 21 are formed. Further, between the grooves 152 of the load-side side plate 15, a bolt hole 153 is formed. On the other hand, on a surface of the opposite load-side side plate 16 at the rotor core 20 side, in other words, on a surface thereof at the axial load side, grooves (not illustrated. described with the same symbol as the groove 152 at the load-side side plate 15 side, hereinafter) into which the end parts of the plurality of rotor-side permanent magnets 21 at the axial opposite load side are fitted and which have the same number as the rotor-side permanent magnets 21 are formed. Further, between the grooves 152 of the opposite load-side side plate 16, bolt holes (not illustrated. described with the same symbol as the bolt hole 153 at the load-side side plate 15 side, hereinafter) are formed.

The rotor core 20 is fixed to surfaces of the side plates 15, 16 at an inside in the axis direction with a plurality of bolts B2 in a state where both axial end parts of the rotor-side permanent magnet 21 are fitted into each of the grooves 152, 152 of the side plates 15, 16. Each of the bolt B2 passes through the bolt hole 153 of the opposite load-side side plate 16 and the magnetic pole part 20a from the axial opposite load side of the opposite load-side side plate 16, and is screwed into the bolt hole 153 of the load-side side plate 15.

Further, at the end part of the rotary electrical machine 1 at the axial opposite load side, there is disposed a rotational position detector 18 detecting a position of the rotor 3

(magnetic pole position in the example) by detecting the rotational position to-be detected component (not illustrated). The rotational position to-be detected component is mounted on any one of components relatively rotatably mounted on the shaft 10, in this example, at the end part of the opposite load-side side plate 16 (not particularly illustrated).

The rotary electrical machine 1 includes a regulation member 100. The regulation member 100 is configured to regulate a fluctuation range of the relative angle between the shaft 10 and the rotor core 20 to a predetermined angle range when the shaft 10, the cylindrical member 6, and the plurality of shaft-side permanent magnets 8 are rotated about the axis "k" relatively with the rotor core 20, the plurality of rotor-side permanent magnets 21, and the side plates 15, 16. According to the present embodiment, the regulation member 100 is configured as described below.

As illustrated in FIG. 4, on an axial load-side end part 6c and an opposite load-side end part 6a of the cylindrical member 6, a protruding part 61 (corresponding to an example of first protruding part) protruding toward radially outside is formed with equal space in the rotational direction at three points for example.

Further, on the radial outside of the protruding part 61, a protruding part 151 (corresponding to an example of second protruding part) capable of engaging with the protruding part 61 is formed toward radially inside on the inner circumference of the load-side side plate 15 and the opposite load-side side plate 16.

FIG. 4 illustrates a positional relationship between the protruding part 61 and the protruding part 151 in a state where the rotor core 20 is held at the predetermined angular position with respect to the shaft 10 with the magnetic suction force of the rotor-side permanent magnet 21. In other words, at both ends of the protruding part 61 in the rotational direction, the voids 30a and 30b in the same size are formed between the protruding part 61 and the protruding part 151.

The voids 30a and 30b are formed to have the same magnetic pole pitch, the fluctuation range of the relative angle between the shaft 10 and the rotor core 20 is regulated to the angle range of the magnetic pole pitch.

The load-side side plate 15, the opposite load-side side plate 16, the plurality of rotor-side permanent magnets 21, and the plurality of shaft-side permanent magnets 8 correspond to an example of means for relatively rotatably connecting the shaft with the rotor core so as to hold the rotor core at a predetermined angular position with respect to the shaft with a magnetic suction force of the permanent magnet and increase the relative angle between the shaft and the rotor core against the magnetic suction force in response to an increase of load torque.

1-2. Principle of Changing Field Magnetic Flux Depending on Magnitude of Load Torque Subsequently, with reference to FIGS. 6 to 8, principle of changing the field magnetic flux depending on a magnitude of the load torque will be described FIG. 6 illustrates a state where the load torque is small. In this state, the rotor core 20 is held with respect to the shaft 10 with the magnetic suction force at the angular position where the magnetic pole part 20a and the shaft-side permanent magnet 8 having the different polarities from each other directly face each other in the radial direction. In this state, the magnetic flux of the magnetic pole part 20a leaks to the shaft-side permanent magnet 8 side, and thus the field magnetic flux becomes small.

FIG. 7 illustrates a state where the load torque is increased to a medium degree. The relative angle between the rotor core 20 and the shaft 10 is increased against the magnetic suction force, in response to the increase of the load torque. In this state, a part where the polarity of the magnetic pole part 20a coincides with that of the shaft-side permanent magnet 8 is increased, and the magnetic flux of the magnetic pole part 20a leaking to the shaft-side permanent magnet 8 side is decreased and the magnetic flux is strengthened by the shaft-side permanent magnet 8, and therefore, the field magnetic flux is increased to the medium degree.

FIG. 8 illustrates a state where the load torque is further increased. This state makes the angular position where the polarity of the magnetic pole part 20a coincides with that of the shaft-side permanent magnet 8, since the rotor core 20 and the shaft 10 are relatively rotated against the magnetic suction force to further increase the relative angle between the rotor core 20 and the shaft 10. In this state, there is almost no magnetic flux of the magnetic pole part 20a leaking to the shaft-side permanent magnet 8 side, and the magnetic flux of the magnetic pole part 20a is further strengthened by the shaft-side permanent magnet 8. Therefore, the field magnetic flux becomes maximum.

1-3. Effect of Present Embodiment

The rotary electrical machine 1 of the present embodiment described above includes the shaft 10 to which the rotor 3 is rotatably supported, the rotor core 20 relatively rotatably mounted on the shaft 10, and the plurality of rotor-side permanent magnets 21 disposed on the rotor core 20. The rotor core 20 is held with respect to the shaft 10 at the predetermined angular position with the magnetic suction force of the rotor-side permanent magnet 21, and is configured to increase the relative angle with the shaft 10 against the magnetic suction force, in response to the increase of the load torque. With this arrangement, depending on the magnitude of the load torque, the field magnetic flux can be changed in the balance with the magnetic suction force. As a result, since the rotor phase control mechanism for changing the relative angle between the shaft 10 and the rotor core 20 of an oil pressure swing motor, an electrical control device and the like to change the field magnetic flux is not required, the rotary electrical machine 1 of a variable field type having a greatly simplified construction.

As a configuration of changing the field magnetic flux depending on the load torque, it is possible to consider a configuration, for example, in which the rotor core is divided into two in the axis direction, and one is made as a fixing side core fixed to the shaft, and the other one is made as a rotating side core that can relatively rotate with respect to the fixing side core. In this case, since the rotor core is divided into two in the axis direction, compared to a case where it is not divided, the load torque available is decreased to be half. On the other hand, according to the present embodiment, since the axial length of the rotor core 20 is substantially equal to that of the stator core 5, compared to the above configuration, the load torque can be used maximally. As a result, the field can be easily increased against the magnetic suction force.

Further, according to the present embodiment, particularly, the plurality of the shaft-side permanent magnets 8 is fixed to the shaft 10 so as to have different polarities alternately in the rotational direction. The shaft-side permanent magnets 8 are disposed having the same number as the plurality of magnetic pole parts 20a including the plurality of rotor-side permanent magnets 21 on the rotor core 20.

When the load torque is small, the rotor core 20 is held with respect to the shaft 10 with the magnetic suction force at the angular position where the magnetic pole part 20a and the shaft-side permanent magnet 8 having the different polarities from each other directly face each other in the radial direction. With this arrangement, the magnetic flux of the magnetic pole part 20a leaks to the shaft-side permanent magnet 8 side, and thus the field magnetic flux can be decreased. As a result, an inductive voltage is decreased with respect to the power source voltage, and high-speed rotation becomes possible. Further, since iron loss generated in the stator core 5 can be decreased to decrease non-load loss, high efficiency can be obtained.

On the other hand, along with the increase of the load torque, the relative angle between the rotor core 20 and the shaft 10 is increased. Thus, the angular position is gradually obtained where the magnetic pole part 20a and the shaft-side permanent magnet 8 having the same polarity directly face each other in the radial direction. With this arrangement, since the magnetic flux of the magnetic pole part 20a is gradually strengthened by the shaft-side permanent magnet 8, the field magnetic flux can be increased in response to the increase of the load torque. As a result, output torque can be increased. Further, a torque constant is increased to decrease a current value, and thereby it is possible to obtain the high efficiency.

FIG. 9 is a graph illustrating a relationship between the rotation speed and the output torque regarding the rotary electrical machine 1 of the present embodiment, a motor of a first comparative example having comparatively large field magnetic flux, and a motor of a second comparative example having comparatively small field magnetic flux. The motors of the first and second comparative examples do not change the field magnetic flux.

As illustrated in FIG. 9, the motor of the first comparative example having the large field magnetic flux can output high torque in a low speed rotation. However, since, along with the increase of the rotation speed, the inductive voltage becomes large with respect to the power source voltage, a high speed rotation is difficult. The motor of the second comparative example having the small field magnetic flux can perform the high speed rotation, but it cannot output the high torque in the low speed rotation. On the other hand, since the rotary electrical machine 1 of the present embodiment can change the field magnetic flux depending on the magnitude of the load torque, the high torque can be output in the low speed rotation, and the high speed rotation is also possible.

FIG. 10 is a graph illustrating a relationship between the output torque and efficiency regarding the rotary electrical machine 1 of the present embodiment, the motor of the first comparative example having the comparatively large field magnetic flux, and the motor of the second comparative example having comparatively small field magnetic flux.

As illustrated in FIG. 10, the motor of the first comparative example having the large field magnetic flux can be driven at the high efficiency during high torque, but, since the iron loss generated in the stator core is large, the efficiency becomes low during low torque. The motor of the second comparative example having the small field magnetic flux can be driven at comparatively high efficiency during low torque, but, since the field magnetic flux is small, the high torque cannot be output. On the other hand, the rotary electrical machine 1 of the present embodiment can change the field magnetic flux depending on the magnitude of the load torque, and thus it can be driven at the high efficiency from the low torque to the high torque.

Further, according to the present embodiment, particularly, the plurality of rotor-side permanent magnets 21 is radially arranged inside the rotor core 20 such that the same magnetic poles of the rotor-side permanent magnets 21 adjacent to each other in the rotational direction face each other. With this arrangement configuration, it becomes possible to increase an input amount of the rotor-side permanent magnet 21 and to concentrate the magnet flux on the magnetic pole part 20a, thereby realizing the compact rotary electrical machine 1 with high performance.

Further, according to the present embodiment, particularly, effects described below can be obtained. In other words, rotation torque transmission between the shaft 10 and the rotor core 20 is performed via a magnetic force and a member such as the side plates 15, 16. Therefore, the rotor core 20 and the side plates 15, 16 need to be firmly fixed to one another not to generate displacement in the rotational direction. According to the present embodiment, on surfaces of the side plates 15, 16 at the rotor core 20 side, the grooves 152, 152 into which the rotor-side permanent magnets 21 are fitted are formed. The side plates 15, 16 and the rotor core 20 are connected with the bolt B2, but, by fitting the rotor-side permanent magnet 21 into the grooves 152, 152, a rotation-prevention function of the rotor core 20 and the side plates 15, 16 can be further improved.

Further, according to the present embodiment, particularly, relative rotation between the shaft 10 and the rotor core 20 is regulated with a regulation member 100. With this arrangement, the rotation torque can be transmitted between the shaft 10 and the rotor core 20 during high torque. Further, with the regulation member 100, the fluctuation range of the relative angle between the shaft 10 and the rotor core 20 is regulated to the angle range of a magnetic pole pitch or less. With this arrangement, within an appropriate range of the relative angle, the shaft 10 and the rotor core 20 can be relatively rotated. Further, the angle range for the relative rotation in either direction of one side or the other side in the rotational direction can be regulated.

Further, according to the present embodiment, particularly, the protruding part 61 protruding toward radially outside at both axial end sides of the cylindrical member 6 is engaged with the protruding part 151 protruding toward radially inside at an inner circumference side of the side plates 15, 16, so that the fluctuation range of the relative angle between the shaft 10 and the rotor core 20 is regulated. With such a configuration, it becomes possible to effectively change the field magnetic flux, depending on the magnitude of the load torque.

Further, according to the present embodiment, particularly, effects as described below can be obtained. In other words, supposedly, when the rotational position to-be detected component is connected with a shaft 10 side, the rotational positions of the shaft 10 and the rotor core 20 are different from each other due to the relative rotation, and thus a magnetic pole position of the rotor 3 cannot be accurately detected. According to the present embodiment, the rotational position to-be detected component is mounted on either of components relatively rotatably mounted on the shaft 10. Therefore, the magnetic pole position of the rotor 3 can be accurately detected.

Further, according to the present embodiment, particularly, the rotor core 20 is fixed to the side plates 15, 16 with the bolt B2 passing through the magnetic pole parts 20a. With this arrangement, the rotor core 20 and the side plates 15, 16 can be firmly fixed with each other.

Further, according to the present embodiment, particularly, the rotary electrical machine 1 does not include the rotor phase control mechanism for increasing the relative angle between the shaft 10 and the rotor core 20. With this arrangement, the rotary electrical machine 1 of a variable field type having a greatly simplified construction can be realized.

1-4. Modification Example of First Embodiment

The first embodiment is not limited to the above-described content, but various modifications can be made within gist and technical ideas of the disclosure. Such modification examples will be described below. In the modification examples below, parts different from those of the first embodiment will be mainly described. Further, constituent elements having the substantially same functions as those of the first embodiment will be indicated with the same symbols in principle, and those constituent elements will not be repeatedly described.

1-4-1. When Elastic Body is Arranged Between Protruding Parts

As illustrated in FIG. 11, according to the present modification example, elastic bodies 19 including for example, rubber and resin, are arranged respectively in respective voids 30a, 30b formed in regions where the axial load-side end part 6c and the load-side side plate 15 of the cylindrical member 6 radially face each other.

Shape and hardness of each elastic body 19 are adjusted to appropriately adjust the fluctuation range of the relative angle between the shaft 10 and the rotor core 20 with respect to the load torque. In the example illustrated in FIG. 11, the elastic body 19 is in a substantially circular shape viewed in a cross section, but, other shape may be adopted.

According to the present modification example, the regulation member 100 includes the protruding part 61 of the cylindrical member 6, the protruding part 151 of the load-side side plate 15 and the opposite load-side side plate 16, and the elastic body 19.

According to the present modification example described above, the elastic body 19 is arranged between the protruding part 61 and the protruding part 151. With this arrangement, by adjusting the shape and hardness of the elastic body 19, it is possible to adjust the angle range with respect to the load torque, and to smooth the relative rotational movement between the shaft 10 and the rotor core 20. Further, a shock when the protruding part 61 is engaged with the protruding part 151 is absorbed to prevent the protruding parts 61, 151 from being damaged and deformed.

1-4-2. When Rotational Position to-be Detected Device is Arranged on Opposite Load-Side Side Plate As illustrated in FIG. 12, the stator 2, the frame 4, the cylindrical member 6, the shaft-side permanent magnet 8, the load-side bracket 11, the bearings 12, 14, the load-side side plate 15, the rotor core 20 and the rotor-side permanent magnet 21 included in the rotary electrical machine 1A according to the present modification example are substantially same as those in the first embodiment. In the rotary electrical machine 1A, a point different from the first embodiment is that the shaft 10A in place of the shaft 10, an opposite load-side bracket 13A in place of the bracket 13, an opposite load-side side plate 16A in place of the opposite load-side side plate 16, a rotational position to-be detected component 17A in place of the rotational position to-be detected component (not illustrated), a rotational position detector 18A in place of the rotational position detector 18 are included.

In other words, according to the present modification example, the rotational position to-be detected component 17A is mounted on the opposite load-side side plate 16A that is one of the parts relatively rotatably mounted on the shaft 10. Further, the rotational position detector 18A is arranged to face the rotational position to-be detected component 17A in the axis direction.

According to the present modification example, a construction of the shaft 10A can be more simplified and strengthened, to simplify the construction of the rotary electrical machine 1A.

2. Second Embodiment

Subsequently, a second embodiment will be described below. In the second embodiment, parts different from those of the first embodiment will be mainly described. Further, the constituent elements having the substantially same functions as those of the first embodiment will be indicated with the same symbols in principle, and those constituent elements will not be repeatedly described.

2-1. Configuration of Rotary Electrical Machine

First, with reference to FIG. 13, a configuration of a rotary electrical machine according to the present embodiment will be described. A state of each configuration of the rotary electrical machine illustrated in FIG. 13 corresponds to a case where the load torque is small.

In FIG. 13, a stator 2, a frame 4, brackets 11, 13, bearings 12, 14, side plates 15, 16, the rotational position to-be detected component, and rotational position detector 18 included in the rotary electrical machine 1' according to the present embodiment (not particularly illustrated) are substantially same as those of the first embodiment. In the rotary electrical machine 1', a point different from the first embodiment is mainly the configurations of the rotor, shaft, and the cylindrical member, and that the permanent magnet is not fixed to the shaft, and the like.

In other words, a rotor 3' of the present embodiment is arranged inside the stator 2 to face an inner circumferential surface of the stator 2 in the radial direction via a magnetic void. The rotor 3' includes a rotor core 20' in a substantially cylindrical shape, a shaft 10' rotatably supposed about the axis "k" radially inside the stator 2 and including an appropriate magnetic body arranged to be coaxial with the rotor 3' inside the rotor core 20', and a plurality of (sixteen in an example in FIG. 13) permanent magnets 21' (corresponding to an example of first permanent magnet).

The rotor core 20' is formed to have the substantially same axial length as the stator core 5. Further, the rotor core 20' is mounted on an outer circumference of the shaft 10', can be rotated about the axis "k" with respect to the stator 2, and can be relatively rotated about the axis "k" with respect to the shaft 10' and a cylindrical member described below.

The plurality of permanent magnets 21' is arranged inside the rotor core 20', and rotated along with the rotation of the rotor core 20'. In other words, in the rotor 3', the plurality of permanent magnets 21' is embedded into the rotor core 20', and the rotary electrical machine 1' is configured as a motor of an IPM type. Further, the plurality of permanent magnets 21' includes, more specifically, a plurality of pairs of permanent magnets 21' (eight pairs in the example in FIG. 13), with two permanent magnets 21', 21' adjacent to each other in the rotational direction as one pair (indicated with a symbol 22 in FIG. 13). Each pair 22 of the permanent magnets 21', 21' are arranged inside the rotor core 20' in a shape where distance is increased toward radially outside so that the same magnetic poles (both N poles, or both S poles) face each other (a so-called V-shaped arrangement).

Further, on the rotor core 20', a magnetic pole part 20a' includes the plurality of pairs 22 of permanent magnets 21', 21' between the permanent magnets 21', 21' of each pair 22.

At a position radially facing the rotor core 20' of the shaft 10', protruding pole parts 101 having the same number as the plurality of magnetic pole parts 20a' configured on the rotor core 20' and protruding toward radially outside are formed at equal distance in the rotational direction. Between the protruding pole parts 101 radially inside the rotor core 20', void parts 40 having the same number as the plurality of magnetic pole parts 20a are formed.

When the load torque is small, the rotor core 20' is held with respect to the shaft 10' at the predetermined angular position with the magnetic suction force of the permanent magnet 21'. More specifically, when the load torque is small, the rotor core 20' is held with respect to the shaft 10' with the magnetic suction force of the magnetic pole part 20a' at the angular position where the magnetic pole part 20a' and the protruding pole part 101 directly face each other in the radial direction. The rotor core 20' is configured to increase the relative angle with the shaft 10' against the magnetic suction force in response to increase of the load torque (details will be described below). With this arrangement, it is possible to change the field magnetic flux in the balance with the magnetic suction force, depending on the magnitude of the load torque (details will be described below).

2-2. Principle of Changing Field Magnetic Flux Depending on Magnitude of Load Torque Subsequently, with reference to FIGS. 14 and 15, principle of changing the field magnetic flux depending on the magnitude of the load torque will be described below.

FIG. 14 illustrates a state where the load torque is small. In this state, the rotor core 20' is held with respect to the shaft 10' with the magnetic suction force of the magnetic pole part 20a' at the angular position where the magnetic pole part 20a' and the protruding pole part 101 directly face each other in the radial direction. In this state, since the magnetic flux of the magnetic pole part 20a' leaks to the protruding pole part 101 side, the field magnetic flux becomes small.

As the load torque is increased, since the rotor core 20' and the shaft 10' are relatively rotated against the magnetic suction force to increase the relative angle between the rotor core 20' and the shaft 10', the angular position is gradually obtained where the magnetic pole part 20a' and the void part 40 directly face each other in the radial direction. With this arrangement, since the magnetic flux of the magnetic pole part 20a' leaking to the protruding pole part 101 side is gradually decreased, the field magnetic flux is increased in response to the increase of the load torque.

FIG. 15 illustrates a state where the load torque is further increased. In this state, the rotor core 20' and the shaft 10' are relatively rotated against the magnetic suction force, and the relative angle between the rotor core 20' and the shaft 10' is further increased. Therefore, the angular position is gradually obtained where the magnetic pole part 20a' and the void part 40 directly face each other in the radial direction. In this state, there is almost no magnetic flux of the magnetic pole part 20a' leaking to the protruding pole part 101 side, and thus the field magnetic flux becomes maximum.

2-3. Effect by the Present Embodiment

In the rotary electrical machine 1' according to the present embodiment described above, similarly to the first embodiment, it becomes possible to change the field magnetic flux in the balance with the magnetic suction force, depending on the magnitude of the load torque. As a result, since the rotor phase control mechanism is not required for changing the relative angle between the shaft 10' and the rotor core 20' to change the magnetic flux, the rotary electrical machine 1' of a variable field type having the greatly simplified construction can be realized.

Further, according to the present embodiment, particularly, the plurality of permanent magnets 21' includes a plurality of pairs with two permanent magnets 21', 21' adjacent to each other in the rotational direction as one pair. Each pair 22 of the permanent magnets 21', 21' are arranged in a shape where the distance is increased toward radially outside so that the same magnetic poles face each other inside the rotor core 20'. With this arrangement configuration, a freedom level of layout of the permanent magnets 21' on the rotor core 20' can be improved.

Further, according to the present embodiment, particularly, the plurality of protruding pole parts 101 is disposed at the position facing the rotor core 20' of the shaft 10' in the axis direction, and the plurality of void parts 40 is formed between the protruding pole parts 101 radially inside the rotor core 20'. The protruding pole parts 101 and void parts 40 are disposed having the same number as the plurality of magnetic pole parts 20a' including the plurality of permanent magnets 21' on the rotor core 20'.

When the load torque is small, the rotor core 20' is held with respect to the shaft 10' with the magnetic suction force of the magnetic pole part 20a' at the angular position where the magnetic pole part 20a' and the protruding pole part 101 directly face each other in the radial direction. With this arrangement, since the magnetic flux of the magnetic pole part 20a' leaks to the protruding pole part 101 side, the field magnetic flux can be decreased. As a result, the inductive voltage is decreased with respect to the power source voltage, and thus it becomes possible to perform the high speed rotation. Further, since the iron loss generated in the stator core 5 is decreased to decrease the non-load loss, it is possible to obtain the high efficiency.

On the other hand, as the load torque is increased, the relative angle between the rotor core 20' and the shaft 10' is increased, and the angular position is gradually obtained where the magnetic pole part 20a' and the void part 40 directly face each other in the radial direction. With this arrangement, since the magnetic flux of the magnetic pole part 20a' leaking to the protruding pole part 101 side is gradually degreased and the magnetic flux of the magnetic pole part 20a' is gradually strengthened, it is possible to increase the field magnetic flux in response to the increase of the load torque. As a result, the output torque can be increased. Further, since the torque constant is increased to decrease the current value, the high efficiency can be obtained.

Further, according to the present embodiment, as described in the first embodiment, the permanent magnet is not required unlike a case where the plurality of shaft-side permanent magnets 8 is fixed to the shaft 10, to have the different polarities alternately in the rotational direction.

Therefore, the number of components and costs can be cut to realize the compact rotary electrical machine 1 at a low cost.

Note that the embodiments are not limited to the above, and various modifications may be made without deviating from the subject and scope of the present disclosure.

In addition, techniques by the embodiment and each modified example may be appropriately combined and utilized in addition to the examples having already described above.

In addition to that, although exemplification is not performed one by one, the embodiment and each modified example are carried out by various changes being applied thereto without deviating from the subject and scope of the present disclosure.

What is claimed is:

1. A rotary electrical machine of a variable field type configured to change a field magnetic flux, the rotary electrical machine comprising:
    a stator including stator windings and a stator core; and
    a rotor provided in the stator to be surrounded by the stator and to be rotatable around an axis, the rotor comprising:
        a shaft provided to be rotatable around the axis;
        a rotor core mounted on the shaft to be relatively rotatable with respect to the shaft around the axis, the rotor core having an axial length along the axis approximately same as an axial length of the stator core along the axis;
        first permanent magnets disposed on the rotor core;
        a cylindrical member fixed to an outer circumference of the shaft,
        second permanent magnets fixed to an outer circumference of the cylindrical member so as to have different polarities alternately in a rotational direction, and having a same number as a plurality of magnetic pole parts each formed between the plurality of first permanent magnets on the rotor core, the second permanent magnets facing the magnetic pole parts in a radial direction, and
    wherein the rotor core is held with respective to the shaft at an angular position where the magnetic pole part and the second permanent magnet which mutually have different polarities face each other in the radial direction,
    wherein the rotor is configured to change a relative angle between the magnetic pole part and the second permanent magnet which mutually have different polarities depending on magnitude of a load torque.

2. The rotary electrical machine according to claim 1, wherein the plurality of first permanent magnets are disposed radially inside the rotor core so that same magnetic poles of the first permanent magnets adjacent to each other in the rotational direction face each other, wherein the rotor core is held with respective to the shaft at the angular position where the adjacent first permanent magnets and the second permanent magnet which mutually have different polarities face each other in the radial direction.

3. The rotary electrical machine according to claim 2, further comprising:
    two side plates relatively rotatably mounted on the shaft, and fixed to both axial ends of the rotor core,
    wherein the side plate includes a groove into which the first permanent magnet is fitted on a surface of a side of the rotor core.

4. The rotary electrical machine according to claim 1, further comprising:
    a regulation member configured to regulate a fluctuation range of the relative angle between the shaft and the rotor core to an angle range not more than a magnetic pole pitch.

5. The rotary electrical machine according to claim 4, further comprising:
    two side plates relatively rotatably mounted on the cylindrical member, and fixed to the both axial ends of the rotor core,
    wherein the regulation member includes:
    a first protruding part protruding toward radially outside on at least one end side of the cylindrical member in an axis direction; and
    a second protruding part protruding toward radially inside on an inner circumferential side of at least one of the two side plates, and being capable of engaging with the first protruding part.

6. The rotary electrical machine according to claim 5, wherein the regulation member includes an elastic body arranged between the first protruding part and the second protruding part.

7. The rotary electrical machine according to claim 1, wherein a rotational position to-be detected component for detecting a position of the rotor is mounted on any of components relatively rotatable mounted on the shaft.

8. The rotary electrical machine according to claim 7, further comprising:
    two side plates relatively rotatably mounted on the shaft, and fixed to both axial ends of the rotor core,
    wherein the rotational position to-be detected component is mounted on the side plate fixed to an end part of the rotor core on an axial opposite load side.

9. The rotary electrical machine according to claim 1, further comprising:
    two side plates relatively rotatably mounted on the shaft, and fixed to both axial ends of the rotor core,
    wherein the rotor core is fixed to the two side plates with a bolt passing through each magnetic pole part formed by the plurality of first permanent magnets on the rotor core.

* * * * *